United States Patent [19]
Pittas et al.

[11] Patent Number: 5,296,936
[45] Date of Patent: Mar. 22, 1994

[54] COMMUNICATION APPARATUS AND METHOD FOR TRANSFERRING IMAGE DATA FROM A SOURCE TO ONE OR MORE RECEIVERS

[75] Inventors: John L. Pittas, Bethel, Conn.; Sung M. Choi, White Plains, N.Y.; Leon Lumelsky, Stamford, Conn.; Alan W. Peevers, Berkeley, Calif.

[73] Assignee: International Business Machines Corporation, Armonk, N.Y.

[21] Appl. No.: 734,383

[22] Filed: Jul. 22, 1991

[51] Int. Cl.⁵ .................................. H04N 1/00
[52] U.S. Cl. ........................... 358/407; 358/404; 358/405; 358/406
[58] Field of Search ............. 358/400, 403, 404, 405, 358/406, 407, 434, 435, 436, 438, 439, 440, 444, 75

[56] References Cited

U.S. PATENT DOCUMENTS

| | | | |
|---|---|---|---|
| 4,039,757 | 8/1977 | Frisone | 179/15 AL |
| 4,342,995 | 8/1982 | Shima | 340/825.5 |
| 4,365,294 | 12/1982 | Stokken | 364/200 |
| 4,380,052 | 4/1983 | Shima | 364/900 |
| 4,408,300 | 10/1983 | Shima | 364/900 |
| 4,562,533 | 12/1985 | Hodel et al. | 364/200 |
| 4,617,566 | 10/1986 | Diamond | 340/870.11 |
| 4,644,468 | 2/1987 | Doster et al. | 364/200 |
| 4,654,484 | 3/1987 | Reiffel et al. | 379/53 |
| 4,660,169 | 4/1987 | Norgren et al. | 364/900 |
| 4,706,081 | 11/1987 | Hart et al. | 340/825.03 |
| 4,720,784 | 1/1988 | Radhakrishnan et al. | 364/200 |
| 4,723,120 | 2/1988 | Petty, Jr. | 340/825.02 |
| 4,736,249 | 4/1988 | Iizuka et al. | 358/435 |
| 4,742,484 | 5/1988 | Yanai et al. | 364/900 |
| 4,759,015 | 7/1988 | Takai et al. | 370/86 |
| 4,775,931 | 10/1988 | Dickie et al. | 364/200 |
| 4,792,947 | 12/1988 | Takiyasu et al. | 370/86 |
| 4,805,170 | 2/1989 | Fergeson et al. | 370/89 |
| 4,814,970 | 3/1989 | Barbagelata et al. | 364/200 |
| 4,825,435 | 4/1989 | Amundsen et al. | 370/97 |
| 4,833,605 | 5/1989 | Terada et al. | 364/200 |
| 4,860,200 | 5/1989 | Holmbo | 364/200 |
| 4,914,574 | 4/1990 | Terada et al. | 364/200 |
| 4,914,625 | 4/1990 | Billian | 364/900 |
| 4,970,603 | 11/1990 | Kanai | 358/434 |
| 5,065,254 | 11/1991 | Hishida | 358/400 |

FOREIGN PATENT DOCUMENTS

| | | | |
|---|---|---|---|
| 0079159 | 10/1982 | European Pat. Off. | G06F 3/04 |
| 0177429 | 4/1985 | France | H04L 11/16 |
| 57-173255A | 10/1982 | Japan | 358/404 |
| 59-122170A | 7/1984 | Japan | 358/404 |
| 60-80371A | 5/1985 | Japan | H04N 1/46 |
| 63-240660 | 10/1988 | Japan | G06F 15/16 |

OTHER PUBLICATIONS

1988 IEEE International Symposium On Circuits And Systems Proceedings vol. 1/3, Jun. 7, 1988 ESPOO, Finland pp. 815-818 B. Jeren 'Sprint: A Signal processing ring network for high speed application'.

(List continued on next page.)

Primary Examiner—Edward L. Coles, Sr.
Assistant Examiner—Jerome Grant
Attorney, Agent, or Firm—Perman & Green

[57] ABSTRACT

A high-speed communications network (10) provides singlecast, multicast, or broadcast image data capability and is implemented utilizing the High-Performance Parallel Interface (HPPI) as a physical channel. A server (12) includes both a HPPI receiver and transmitter. Workstations (18) support a HPPI-compatible receiver (14b), but require only a simplified HPPI output port (20). The workstations are connected such the receiver port of each is driven by data and control signals from an upstream server HPPI transmitter port. Handshaking signals, generated by the receiver ports, ripple upstream to the server or to an upstream workstation output port. A packet of data bursts corresponds to either a complete image frame, or to a rectangular subsection thereof, referred to as a window. A first burst is defined to be a Header burst and contains an Image Header that specifies addresses of addressed workstations. Following the Header burst are image data bursts containing pixel data organized in raster format.

27 Claims, 8 Drawing Sheets

OTHER PUBLICATIONS

Japan Telecommunication Review vol. 29, No. 1, Jan. 1987, Tokyo JP pp. 57–62 S. Watanabe 'DIPS computer complex feature 100Mb/s optical fiber rings'.

EP,A, 0 177 429 (MATRA) Apr. 9, 1986 see p. 1 line 1 p. 4, line 33 p. 6, line 18 p. 17, line 30 abstract and FIGS. 1, 2, 10.

Patent Abstracts of Japan vol. 13, No. 47 (P-822) (3395) Feb. 3, 1989 & JP A, 63,240 660.

Proceedings IEEE International Conference of Computer Design: VLSI in Computers 7 Oct. 1985, Port Chester, N.Y. pp. 407–410 T. A. Chu "A design methodology for concurent VLSI systems".

COMMUNICATION APPARATUS AND METHOD FOR TRANSFERRING IMAGE DATA FROM A SOURCE TO ONE OR MORE RECEIVERS

FIELD OF THE INVENTION

This invention relates generally to data communication apparatus and method and, in particular, to apparatus and method for rapidly transferring large blocks of data, such as image data.

BACKGROUND OF THE INVENTION

A single computer generated image of medium resolution, for example 1024 horizontal by 1024 vertical picture elements (pixels), each having eight bits per red, green and blue color, requires approximately three million bytes (3 MB) of data to express. Transferring such a large data file between data processors, such as workstations, places a significant burden on conventional high-speed serial networks.

Furthermore, performing animated display sequences, which may require realtime display update rates of 30 frames/second or more, is impossible to accomplish with presently available serial interface technologies.

As such, it is desirable to employ a parallel data interface technology so as to increase the bandwidth of the communications bus. One parallel interface technology is described in a specification entitled "High-Performance Parallel Interface Mechanical, Electrical, and Signalling Protocol Specification (HPPI-PH)" preliminary draft proposed, American National Standard for Information Systems, Nov. 1, 1989, X3T9/88-127, X3T9.3/88-032, REV 6.9, the disclosure of which is incorporated by reference herein.

The HPPI interface specifications provides for transfers of 100M bytes/second using a 32-bit port, or 200M bytes/second if a 64-bit port is used. This particular interface technology is thus particularly attractive for use in transferring, by example, digital image animations between workstations.

However, the HPPI interface is intended as a point-to-point, simplex interface between mainframe computers, or between a mainframe and a high-speed disk storage system. The distance between nodes is limited to 25 meters and connections between multiple nodes, so as to provide broadcast or multicast transmissions, is not intended.

It is thus an object of the invention to provide a high speed, high bandwidth parallel communications bus for simultaneously transferring image data from an image server to a plurality of workstations.

It is another object of the invention to provide method and apparatus for use by a plurality of workstations in receiving image data from an image data server and for propagating communication bus control signals to the server.

SUMMARY OF THE INVENTION

The foregoing and other problems are overcome and the objects of the invention are realized with multiple workstations that are connected to a data server by means of a high-speed physical data channel in a simplex daisy chain topology. Each workstation supports the electrical and signal protocols required of a physical channel receiver, and also regenerates and retransmits these signals to another downstream-connect workstation. A server, which is source of image data, generates the signaling protocols of a transmitter in order to control the data channel. The workstations, which implement data receivers, retransmit the data and signaling protocols generated by the server to downstream receivers. In addition, each workstation provides retransmission of any handshaking signals from a downstream workstation to an upstream workstation, or to the server. In the case of multicasting, wherein the server addresses data to multiple workstations, upstream workstations synchronize locally generated handshaking signals with handshaking signals received from downstream workstations so as to maintain data order integrity and to ensure that all addressed workstations are prepared to receive a transmission from the server.

The signaling protocol of the physical channel provides selective addressing of individual receivers by the server to provide multicasting. This addressing may be implemented as either a connection based switching mechanism or provided on a data block basis, such that each logical data block contains the addresses of the intended receivers.

A packet of data bursts is defined to correspond to either a complete image frame, or to a rectangular subsection thereof, referred to as a window. A first burst is defined to be a Header burst and contains an Image Header that specifies addresses of addressed workstations. Following the Header burst are image data bursts containing pixel data organized in raster format.

A high-speed multicasting network is implemented utilizing the High-Performance Parallel Interface (HPPI) as the physical channel and is referred to as a HPPI Daisy Chain. The server includes both a HPPI receiver and transmitter. The workstations support a full HPPI receiver, but require only a simplified HPPI output port instead of a HPPI transmitter. The workstations are connected such the receiver port of each is driven by data and control signals from the upstream server HPPI transmitter port, for the first workstation of the Daisy Chain, or the upstream workstation HPPI output port for all other workstations of the Daisy Chain. Handshaking signals, generated by the receiver ports, ripple upstream to the server or to an upstream workstation output port. An optional loop-back connection between the last workstation in the chain and the server may also be included. The loop-back connection provides a means for performing network diagnostics and testing. In a present embodiment the network supports 32 workstations, each placed a maximum of 25 meters from one another. These distances may be extended by use of signal repeater units placed between workstations.

BRIEF DESCRIPTION OF THE DRAWING

The above set forth and other features of the invention are made more apparent in the ensuing Detailed Description of the Invention when read in conjunction with the attached Drawing, wherein.

DETAILED DESCRIPTION OF THE INVENTION

Figure 1:
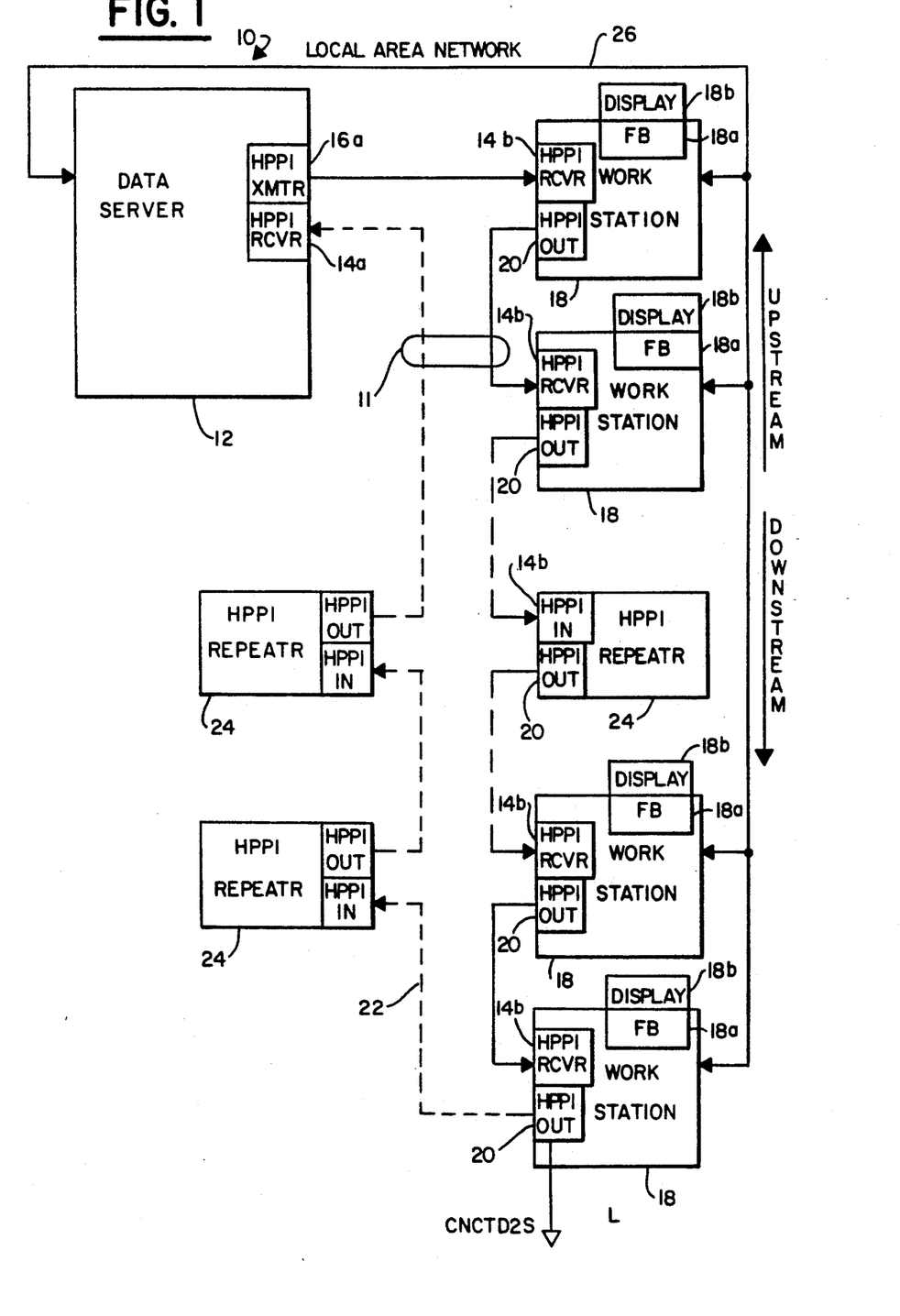
FIG. 1 is a block diagram illustrating a network topology in accordance with an embodiment of the invention.

FIG. 1 illustrates a high speed network 10 that is constructed and operated in accordance with the invention. Network 10 employs a communication bus that conforms to the aforementioned HPPI specification as a physical communications channel 11, also referred to herein as a HPPI Daisy Chain. A data server 12 includes both a HPPI receiver 14a and a HPPI transmitter 16a. By example, the data server 12 may be a supercomputer that generates image data. A plurality of workstations 18 are connected to the HPPI Daisy Chain 11. Each workstation 18 typically includes or controls a frame buffer (FB) 18a and a display 18b for visualizing the image data generated by the data server 12. Each workstation 18 also includes a HPPI receiver 14b, but is not required to implement a HPPI transmitter. Instead, each workstation 18 is provided with a HPPI output port 20. The workstations 18 are coupled together such that the receiver port 14b of each is driven by data and control signals from the upstream server 12 HPPI transmitter 16a or the upstream workstation 18 output port 20. Handshaking signals, generated by each of the workstation 18 output ports 20 are directed upstream to the server 12, or to an upstream workstation 18 HPPI output port 20, depending on the physical location of the workstation within the HPPI Daisy Chain 11. FIG. 1 also illustrates an optional loop-back connection 22 between a last workstation, designated 18$_L$, and the server 12. The HPPI loop-back connection 22 provides a means for performing network diagnostics and testing by enabling the server 12 to transmit a message to the workstations 18 and to receive information therefrom. The network 10, in a present embodiment, supports 32 of the workstations 18, each positioned a maximum of 25 meters from one another. These distances may be extended by the use of Repeater Units 24 of a type described in detail below and illustrated in FIG. 7. A local area network (LAN) 26 is also coupled between the data server 12 and the workstations 18 to resolve any contentions for access to the HPPI physical communications channel 11 and to perform other functions, such as notifying the server 12 of image data requests, error conditions, and other events. One suitable LAN 26 embodiment is a Token Ring.

The network 10 thus provides a forward, high speed HPPI data path for image data from the server 12 to each workstation 18. A slower return path from the workstations 18 to the server 12 is implemented using the LAN 26.

In applications where multiple workstation 18 users require identical or differing image file transfers from the server 12, a logical bit-addressing mechanism, contained in a data word of each image file, provides the server 12 the ability to provide broadcast (all workstations), multicast (some workstations) or singlecast (one workstation) transfers. By means of the LAN 26 and a workstation 18 processor (not shown) the server 12 issues a Logical Unit Number (LUN) to each workstation 18 in the HPPI Daisy Chain 11. This LUN is stored in a HPPI address comparator and is employed to match against a bit-address of an incoming data file. If matched, the data is placed in the workstation 18 FB 18a for display.

Figures 3A, 4:
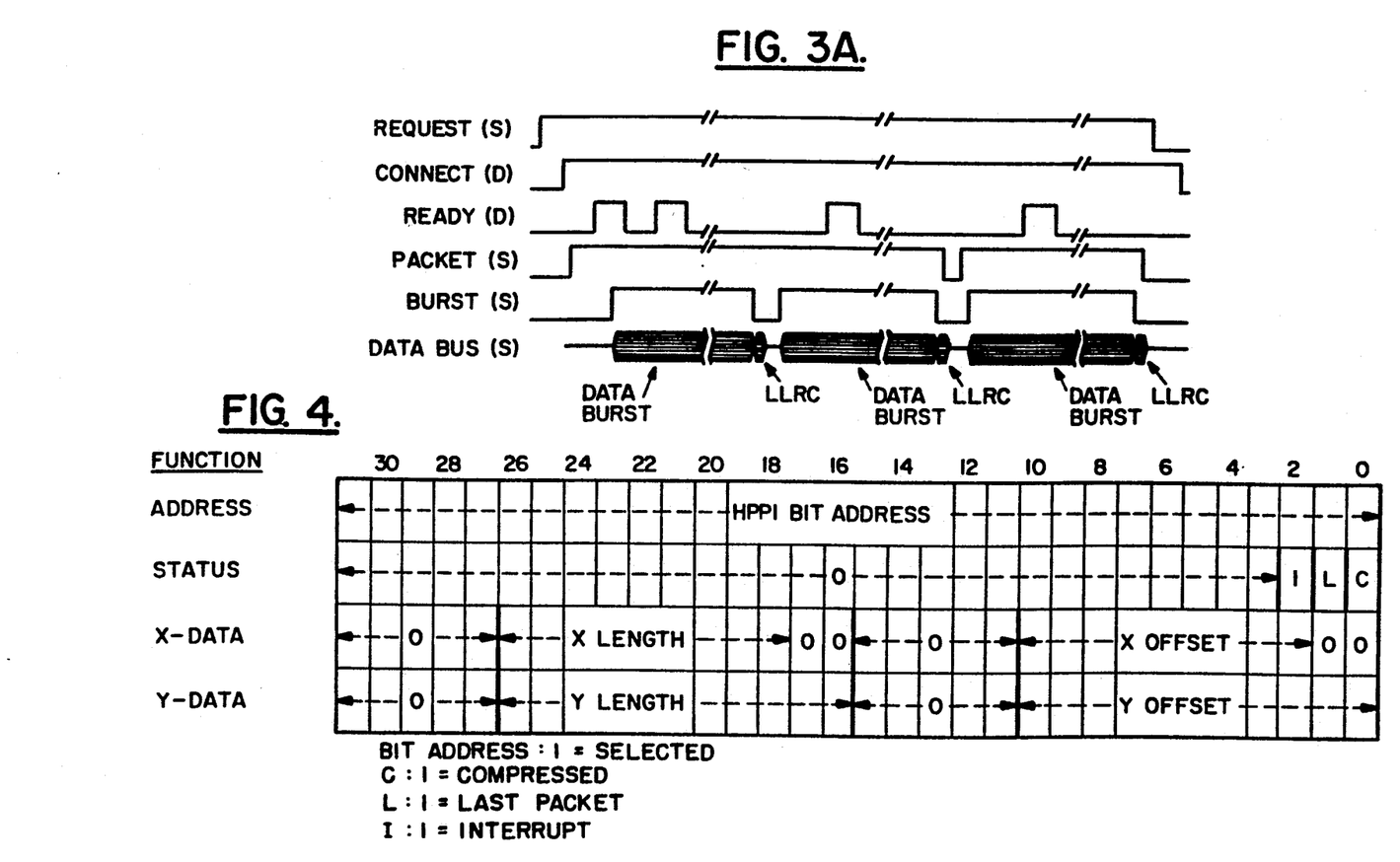
FIG. 3a is an illustrative timing diagram showing a synchronous transfer of three data bursts from a source to a destination.
FIG. 4 illustrates in greater detail the organization of an Image Header data burst of FIG. 3.

The following describes a presently preferred embodiment for a receive-only graphics workstation 18 employing a 32-bit HPPI port. Reference is first made to FIG. 3a for showing an illustrative timing diagram of a synchronous transfer of three data bursts from a source (S) to a destination (D) in accordance with the HPPI specification. Each data burst has associated therewith a length/longitudinal redundancy checkword (LLRC) that is sent from the source to the destination on a 32-bit data bus during a first clock period following a data burst. Packets of data bursts are delimited by a PACKET signal being true. The BURST signal is a delimiter marking a group of words on the HPPI data bus as a burst. The BURST signal is asserted by the source with the first word of the burst and is deasserted with the final word. Each burst may contain from one to 256 32-bit data words. A REQUEST signal is asserted by the source to notify the destination that a connection is desired. The CONNECT signal is asserted by the destination in response to a REQUEST. One or more READY indications are sent by the destination after a connection is established, that is, after CONNECT is asserted. The destination sends one ready indication for each burst that it is prepared to accept from the source. A plurality of READY indications may be sent from the destination to the source to indicate a number of bursts that the destination is ready to receive. For each READY indication received, the source has permission to send one burst. Not shown in FIG. 3a is a CLOCK signal defined to be a symmetrical signal having a period of 40 nanoseconds (25 MHz) and which is employed to synchronously time the transmission of data words and the various control signals.

In summary, the HPPI-PH specification defines a hierarchy for data transfers, where a data transfer is composed of one or more data packets. Each packet is composed of one or more data bursts. Bursts are composed of not more than 256 32-bit data words, clocked at 25 MHz. Error detection is performed across a data word using odd parity on a byte basis. Error detection is performed longitudinally, along a bit column in the burst, using even parity, and is then appended to the end of the burst. Bursts are transmitted on the ability of a receiver to store or otherwise absorb a complete burst. The receiver notifies the transmitter of its ability to receive a burst by issuing the Ready signal. The HPPI-PH specification allows the HPPI-PH transmitter to queue up 63 Ready signals received from a receiver.

Figure 3B:
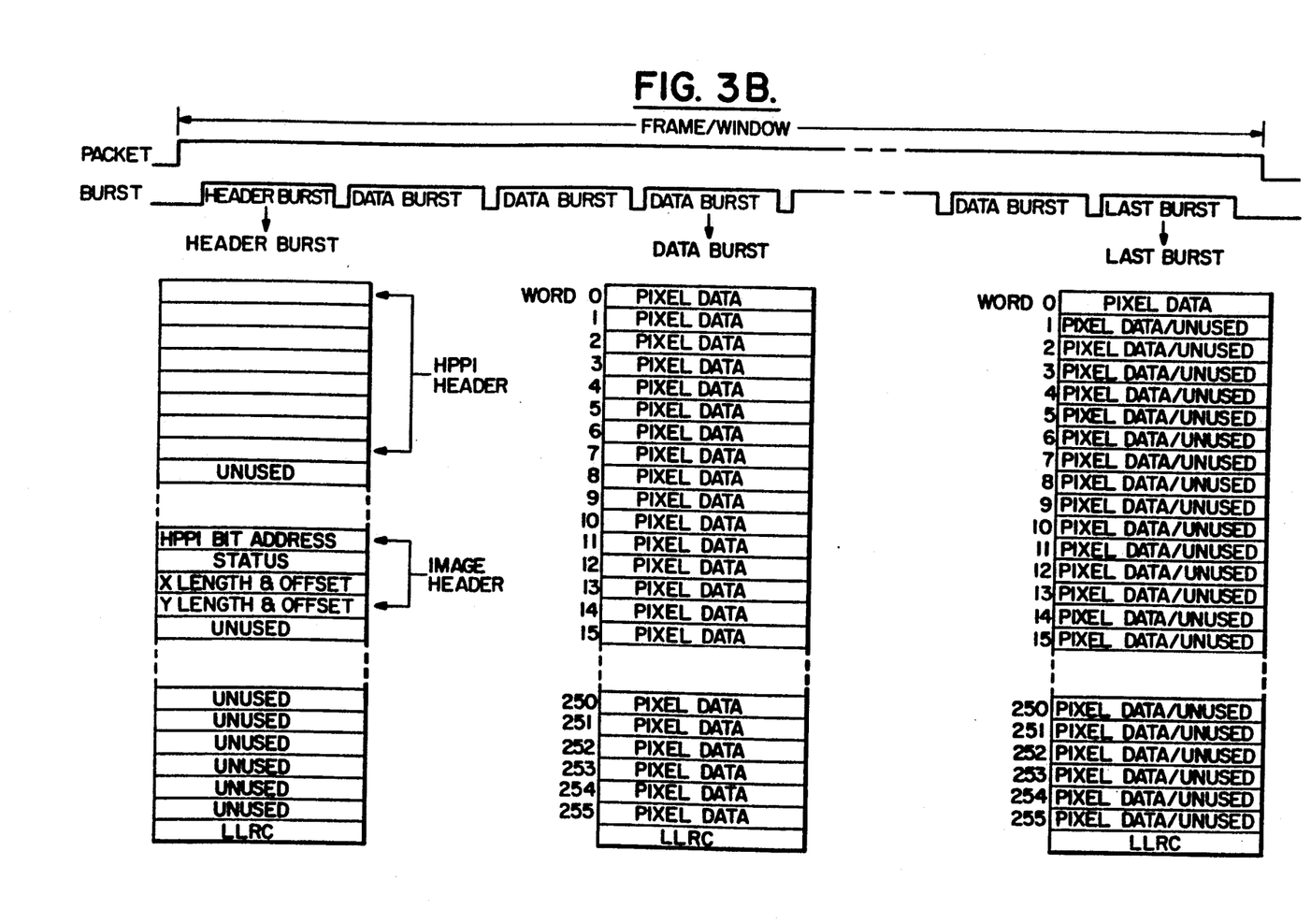
FIG. 3b illustrates a presently preferred packet data format for image data transfers.

FIG. 3b illustrates an adaptation to the HPPI data format of FIG. 3a, in accordance with an aspect of the invention, to accomplish image data transfers. In accordance with the invention a packet of data bursts corresponds to either a complete image frame, or to a rectangular subsection thereof, referred to as a window. The packet includes two or more bursts. A first burst is defined to be a Header burst and contains generic HPPI device information, the HPPI Header, and also image data information, referred to herein as an Image Header. The remainder of the Header burst is presently unused.

Following the Header burst are one or more image data bursts containing pixel data. Pixel data is organized in raster format, that is the left-most pixel of a top display scanline is the first word of the first data burst. This ordering continues until the last pixel of the last scanline. The last burst is padded, if required, to full size. Each data word contains 8-bits of red, green, and blue (RGB) color information for a specific pixel. The remaining 8-bits of each 32-bit data word may be employed in several manners. For systems capable of linearly mixing two images, the additional 8-bits may be used to convey key, or alpha, data for determining the contribution of each input image to a resulting output image. Another use of a portion of the additional 8-bits of each data word is to assign two additional bits to each color for frame buffers capable of supporting 10-bits of RGB data. Also, a number of data packing techniques may be employed wherein the additional 8-bits of each word are used to increase the effective HPPI image transfer bandwidth by one third, when using 24-bit/pixel images.

FIG. 4 illustrates in greater detail the organization of the Image Header of FIG. 3b. A HPPI Bit Address, to which specific workstations 18 respond, is the first word of the Image Header. In that the data word is 32-bits wide, a maximum of 32 unique workstation addresses may be specified. Following the HPPI Bit Address word is a control/status word used to communicate specific image/packet information to the workstation. This includes a bit for indicating if the pixel data is compressed (C), a bit for indicating if the associated Packet is a last packet (L) of a given frame (EOF), and an Interrupt signal (I) which functions as an ATTENTION signal. The last two words of the Image Header (X-DATA and Y-DATA) contain size (length) and location (offset) information for the x and y image directions. By example, if the packet is conveying a full screen of pixel data, x-length and y-length may both equal 1024, for a 1024×1024 resolution screen, and the offsets are both zero. If the packet is instead conveying image data relating to a window within the display screen, x-length and y-length indicate the size of the window and the two offsets indicate the position of the upper-left most corner of the window, relative to a screen reference point. Typically, the screen reference point is the top-left most pixel.

Figure 5:
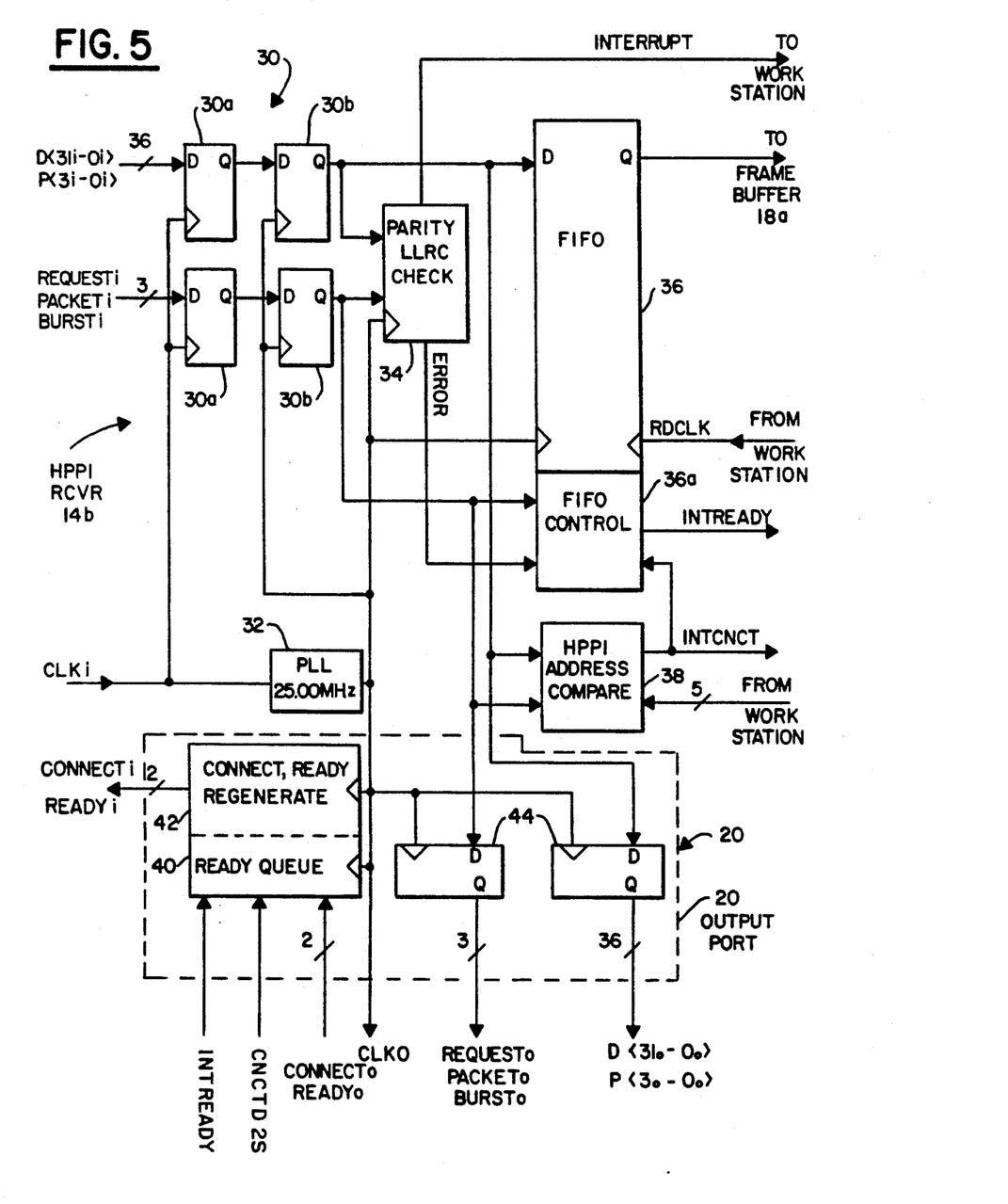
FIG. 5 illustrates in block diagram form a workstation output port for interfacing to the communications network of FIG. 1.

FIG. 5 is a block diagram showing a workstation 18 Daisy Chain port. Functional blocks include input registers 30, a clock phase-locked loop (PLL) 32, Parity/LLRC Checker 34, FIFO memory 36, HPPI Address Comparator 38, Ready Queue 40 and a Connect/Ready Regenerator 42.

The input registers 30 include a first set of D-registers 30a, clocked by an inverted HPPI input clock (CLKi) so as to store received data (D<31:0>), parity (P<3:0>), and control bits (REQUEST, PACKET, BURST) for each CLKi cycle.

The data, parity, and control information are also stored in a second set of D-registers 30b which are clocked by an output clock (CLKo). CLKo is frequency and phase stable and locked to CLKi by the PLL 32 to ensure that CLKo maintains a specific phase relation to CLKi, given a restricted frequency deviation of CLKi. The PLL 32 thus guards against isolated, missing, or extra input clocks, since the PLL 32 is relatively insensitive to momentary input signal instabilities.

Following the CLKo D-registers is the Parity/LLRC Detector 34, the HPPI Address Comparator 38, and the FIFO memory buffer 36. The Parity/LLRC Detector 34 generates a maskable error interrupt to the workstation 18 processor (not shown) which, as stated above, reports the occurrence of the error back to the server 12 via the LAN 26. The workstation 18 may also request, via the LAN 26, a retransmission of an erroneously received image data packet. Of special concern to the Parity/LLRC Detector 34 are errors occurring in the Header Burst, since these may destroy useful data currently in the FB 18a. Therefore, a FIFO controller 36 is coupled to an ERROR signal output by Parity/LLRC Detector 34 to prevent writing image data to the FIFO memory 36 if a Header Burst error is detected. Reference is also made to the flowchart of FIG. 9 for the ensuing discussion of the operation of the workstation receiver and output ports. The HPPI Address Comparator 38 asserts an Internal Connect (INTCNCT) signal if an address for the workstation 18 is detected in the incoming packet's bit address word (FIG. 4). A 5-bit address code is held by a writable register within the comparator 38, the 5-bit code being writable by the workstation 18 processor. The 5-bit code identifies which of the 32-bits of the bit address word correspond to the workstation. By means of the LAN 26 and workstation 18 processor the data server 12 is enabled to dynamically reconfigure the HPPI addresses of the workstations 18. This is a useful feature of the invention, in that workstations 18 may be added to or deleted from the HPPI Daisy Chain 11 with minimal delay.

The assertion of INTCNCT (with no Header Error) to the FIFO Controller 36a enables writing of the packet's data bursts into the FIFO memory 36. The FIFO memory 36 has the capacity to store N data bursts. Data is extracted from the FIFO 36 by means of a RDCLK signal generated by the workstation 18. The extracted data is transferred to the FB 18a for display. When space is available in the FIFO for a full 256 word burst, the FIFO Controller 36a issues an Internal Ready (INTREADY) signal.

In the case of a conventional HPPI receiver, the Ready signal would immediately be sent to the server. However, the HPPI Daisy Chain receiver 14b of the invention operates in a different manner. Specifically, the INTREADY signal is placed in the Internal Ready Queue 40.

In parallel with the operation of the Parity/LLRC Detector 34, the address comparator 38, and the FIFO 36, the input HPPI data, parity, and control signals are clocked into the second set of D-registers 30b by CLKo. The outputs of these registers, and a buffered CLKo, are applied to the output port 20 and drive the downstream extension of the HPPI bus, via a set of output registers 44.

It should be noted that output registers 44 are optional. However, their use is preferred so as to minimize bit skew and maintain HPPI-PH specification timing tolerances to downstream HPPI receivers 14b.

Figure 6:
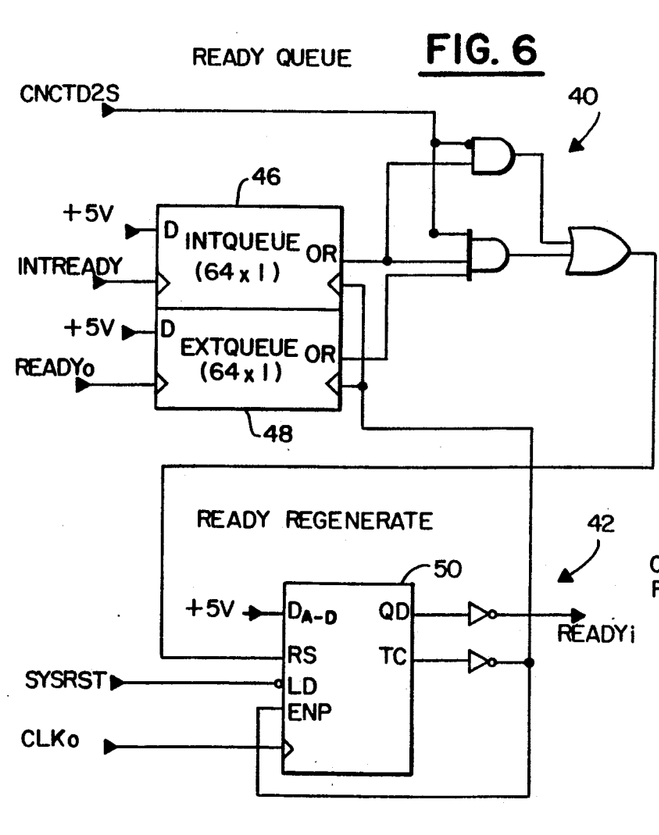
FIG. 6 is a block diagram showing in greater detail a Ready Queue of FIG. 5.
Figure 9:
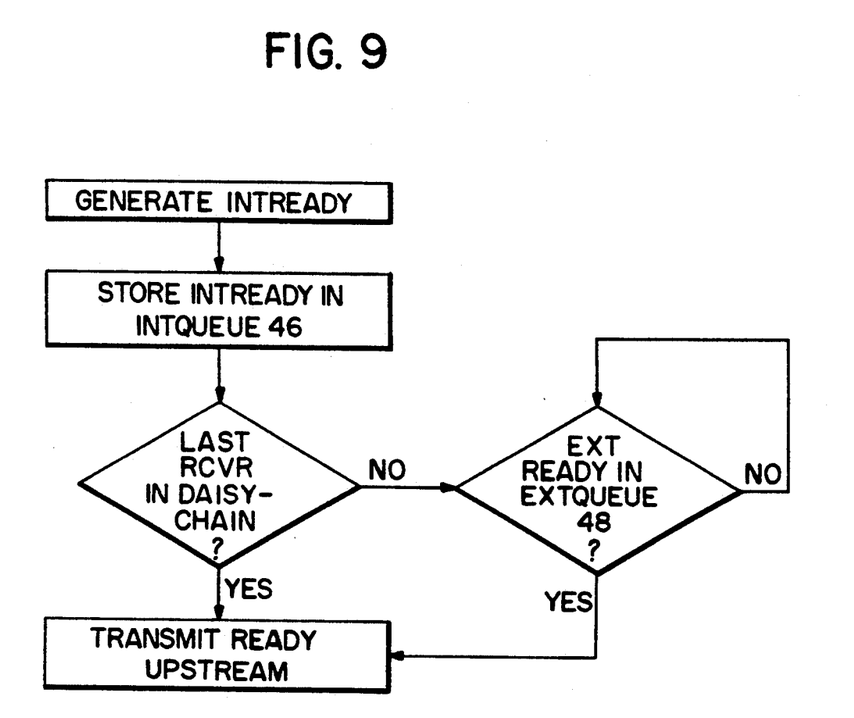
FIG. 9 is a flowchart depicting the operation of a workstation Ready Queue.

FIG. 6 illustrates in greater detail the Ready Queue 40 and the Connect/Ready Regenerate logic 42 of FIG. 5. As mentioned previously, one function of the Ready Queue 40 is to store Internal Ready signals that generated by the FIFO controller 36a. The INTREADY signals are stored within the block INTQUEUE 46, which is preferably implemented with a 64 location by one bit (64×1) FIFO. Another portion of the Ready Queue 40 is an External Ready Queue (EXTQUEUE) 48 which stores incoming Ready 30 signals received from downstream receivers 14b. EXTQUEUE 48 is also preferably implemented with a 64×1 FIFO. As seen in FIG. 9, if there is no downstream receiver 14b, as indicated by the state of a HPPI Interconnect Destination to Source (CNCTD2S) signal, the Ready Regenerator 50 immediately issues a Ready when one enters the INTQUEUE 46. The rate at which the last receiver 14b of the HPPI Daisy Chain issues Ready signals is determined by the state of INTCNCT and the rate at which the associated data FIFO 36 is emptied. If INTCNCT is false, Internal Readys are issued by the FIFO Controller 36a when the HPPI Burst signal transitions from a true state to false state, that is, at the end of a Burst. If INTCNCT is true, Internal Readys are issued only when there is sufficient free memory in the FIFO 36 to accept another Burst. The last workstation 18$_L$ of the HPPI Daisy Chain is therefore the source of all cascading Ready signals.

Upstream workstations, that is those which are interposed between the server 12 and the last workstation 18$_L$, delay issuing a Ready signal until an externally generated Ready signal is stored in the EXTQUEUE 48. With CNCTD2S true, and if INTQUEUE 46 also contains a Ready, both queues are considered to be ready and a Ready signal is sent to the Regenerator 42 for transmission to an upstream receiver 14b. Hence, for workstations 18 which are positioned intermediately in the HPPI Daisy Chain 11, internally generated Ready signals are matched on a one-for-one basis with incoming externally generated Ready signals. This assures that Bursts, cascading down the Daisy Chain, remain synchronized with the Ready indications of all workstations 18.

The rate at which Ready signals are issued is determined by the availability of the FIFO 36 at each addressed workstation 18. A workstation 18 having a slowest FIFO 36 read rate thus paces the network and determines when Readys cascade upstream.

Figure 8:
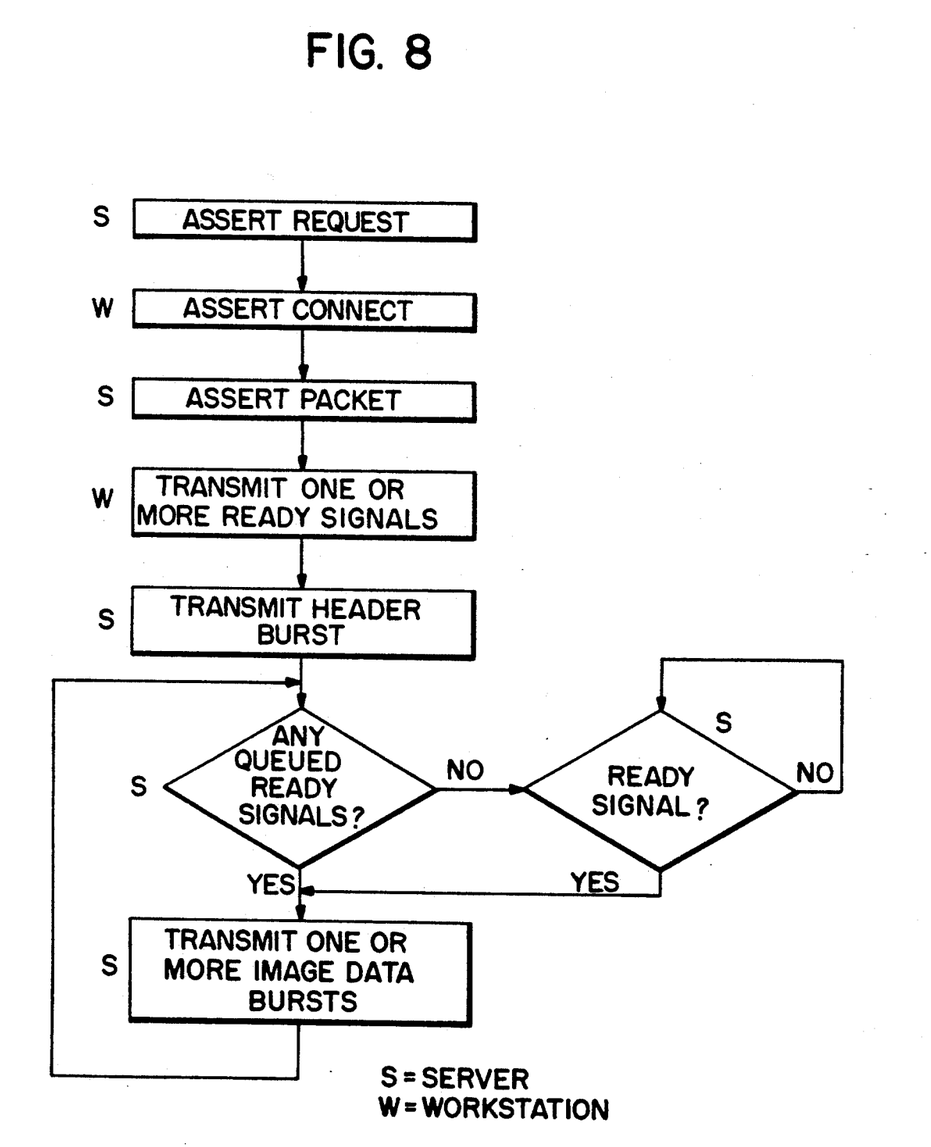
FIG. 8 is a flowchart showing the interaction between a server and workstations in transmitting image data.

The function of the Connect/Ready Regenerator 42 is two fold. First, the Ready Regenerator 50 pulse shapes the outgoing Ready in order to maintain HPPI-PH specifications for this signal. The Ready Regenerator 50 is implemented as a shift register and assures that the outgoing Ready signal is eight 25 MHz clock periods wide. The Terminal Count (Tc) output of the Ready Regenerator 50 also functions to clock the output ports of the INTQUEUE and EXTQUEUE FIFOs 46 and 48. Second, a Connect signal, which is issued by each workstation 18 in response to a Request signal from the server 12 (FIG. 8), also cascades up from the last workstation 18 to the server 12. The Connect signal notifies the server 12 that packet transmissions may begin. A Connect Regenerator (not shown in FIG. 6) reforms the leading edge of the Connect signal and gates the onboard Connect with the incoming External Connect from a downstream workstation 18.

It is noted that the number of Readys issued to the server 12 at the initiation of a Connect is determined by the workstation 18 having the least amount of FIFO 36 memory storage. By example, if the last workstation 18 is capable of accepting 63 data bursts, and had issued 63 Ready signals after connecting, an intermediate workstation 18 having only a single burst sized FIFO 36 stores 62 of the incoming 63 Ready signals within its EXTQUEUE 48. The first of the 63 incoming External Ready signals is gated with the single Internal Ready signal and is propagated upstream.

Figure 7:
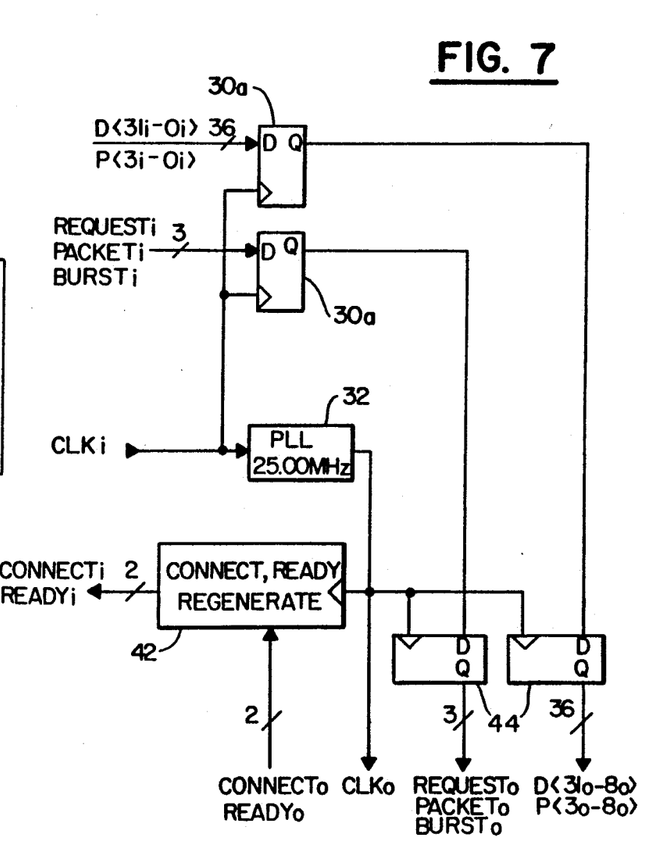
FIG. 7 is a block diagram of a HPPI Repeater Unit used to extend cabling distances between HPPI ports above a specified distance.

FIG. 7 is a block diagram of one of the HPPI Repeater Units 24 used to extend cabling distances between HPPI ports above 25 meters. The Repeater Unit 24 may be employed to overcome distance constraints between any two HPPI devices, whether connected in the Daisy Chain configuration or connected in a conventional HPPI point-to-point manner. The Repeater Unit 24 may also be used to temporarily replace or bridge around a daisy chained workstation 18 that is not currently operational. Also as seen in FIG. 1, networks using the loop-back configuration may employ one or more Repeater Units 24 to duplicate the out-going cable path in the return path to the server 12, thereby minimizing workstation placement constraints.

Figure 2:
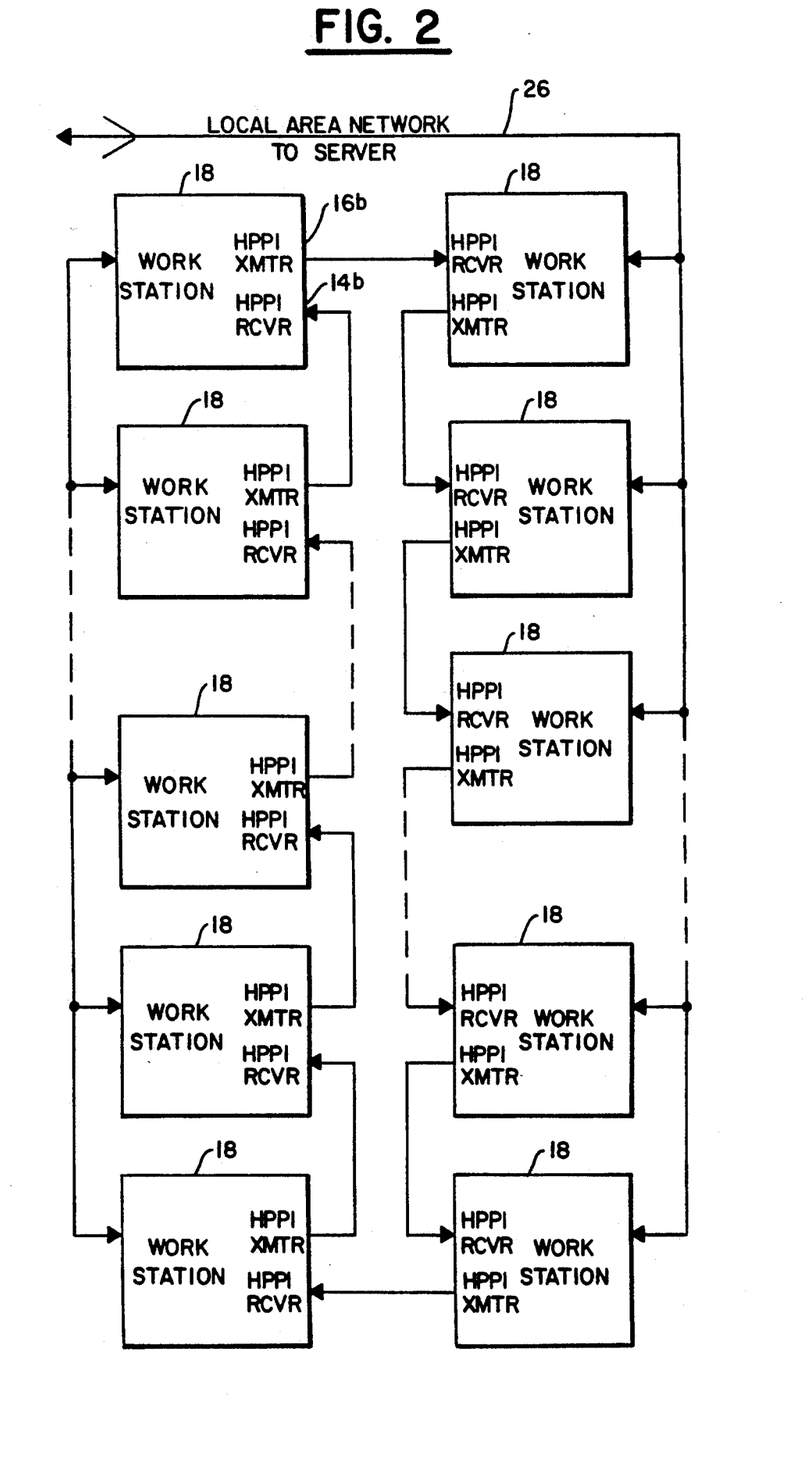
FIG. 2 illustrates a network topology in accordance with another embodiment of the invention.

As can be seen in FIG. 7, the Repeater Unit 24 includes the input buffers 30a, output buffers 44, PLL 32, and the Connect/Ready Regenerator 42 of FIG. 6 to input the HPPI data, parity, and control lines, resynchronize these signals, and transmit same to the next Repeater Unit 24, workstation 18, or to the server 12. FIG. 2 illustrates a further HPPI Daisy Chain topology, whereby data transfers cascade from one workstation 18 to another through a single HPPI channel 30 using the packet format shown in FIGS. 3 and 4. HPPI networking protocols and mechanisms are implemented in each workstation 18, which minimally support a HPPI receiver 14b, and a HPPI transmitter 16b for transferring data downstream. As previously discussed, HPPI handshaking signals Ready and Connect are transferred from downstream workstations 18 to upstream workstations. The workstations 18 are connected in a ring configuration, such that any workstation 18 can source data to any other workstation 18 or to all other workstations 18. Contention for access to the HPPI channel is resolved using communications across the low-speed LAN path 26.

The topology illustrated by FIG. 2 requires minimal additional hardware in addition to the HPPI receiver 14b and transmitter 16b in each workstation 18.

Although the embodiment of FIG. 2 is well suited for its intended use, in applications where the data server 12 is rendering or otherwise generating image data for a number of receive-only graphic workstations, the HPPI Daisy Chain is simplified by replacing the HPPI transmitter 16b in the workstations 18 with the relatively simple output port 20, as depicted in FIGS. 1 and 5. The output port 20 need only latch the data and control signals from the receiver port 14b before retiming the signals to meet HPPI specifications. This approach thus provides an economical solution for rapidly transferring large image data files from workstation to workstation. The embodiment of FIGS. 1 and 5, as described in detail above, is thus presently preferred.

Alternate network topologies, such as a star/hub configuration, whereby each workstation 18 connects to a centralized hub and has data transfers directed by the hub, are also within the scope of the invention, but require a substantial amount of additional circuitry to implement the hub.

Based on the foregoing description of the invention it can be seen that the teaching of the invention provides that broadcast, multicast, or singlecast modes of transmission are transparent to each of the image data receivers and are performed using the same circuitry. Furthermore, through the use of the daisy-chained Ready signals, multiple data bursts may exist on the network and receivers with different size data FIFOs may be connected together without losing synchronization. No specialized bus controllers are required and no arbitration is necessary, as is the case for many communication techniques. The image data receivers are not required to access the communications bus in that the separately provided LAN 26 may be employed for sending status or other information to the data server 12. Furthermore, only communication bus control signals, such as Ready, are daisy-chained through the image data receivers. Other signals, such as the 32-bit data bus, are replicated, or in the case of the clock, are restored. As such, a full transmitter in each image data receiver is not required, although such may be provided as in the embodiment shown in FIG. 2. If one of the image data receivers is taken off-line, the external Ready signal is still generated by the off-line unit, thereby providing a logical bypass.

Although described in the context of the HPPI interface specification it should be appreciated that modifications to this specification may be made while still achieving the same result. Furthermore, other standard or other specially designed word parallel packet-based communications protocols may be employed to realize the benefits of the invention.

Thus, while the invention has been particularly shown and described with respect to a preferred embodiment thereof, it will be understood by those skilled in the ar that changes in form and details may be made therein without departing from the scope and spirit of the invention.

Having thus described our invention, what we claim as new, and desire to secure by Letters Patent is:

1. A method for transmitting image data over a communication bus from a source of image data to one or more of a plurality of image data receivers that are serially coupled along the communication bus, comprising the steps of:

generating, with each of the one or more of the plurality of image data receivers, an internal Ready signal;

storing the internal Ready signal within the image data receiver that generates the internal Ready signal; and determining with each of the one or more of the plurality of image data receivers if a downstream image data receiver, if there be one, has generated an external Ready signal indicating that the downstream image data receiver is ready to receive data; wherein if there is no downstream image data receiver for a particular one of the image data receivers, generating the external Ready signal with the particular one of the image data receivers and providing the generated external Ready signal to an upstream image data receiver, if there be one, or if not, providing the generated external Ready signal to the source;

if the downstream image data receiver for the particular one of the image data receivers has not generated the external Ready signal, idling the particular one of the image data receivers until the downstream image data receiver generates the external Ready signal;

if the downstream image data receiver has generated the external Ready signal, generating the external Ready signal with the particular one of the image data receivers and providing the generated external Ready signal to the upstream image data receiver, if there be one, or if not, providing the generated external Ready signal to the source;

with the source of image data;

receiving the external Ready signal and, responsive thereto, transmitting information to the communication bus for addressing one or more of the image data receivers; and with each of the addressed image data receivers, receiving the transmitted information from the communications bus;

wherein the step of transmitting information includes the step of, transmitting a data burst comprised of data words, at least one of the words specifying an address word comprised of a plurality of bits, individual ones of which, if asserted, identify one of the image data receivers.

2. A method as set forth in claim 1 wherein the step of receiving information includes a step of:

determining if a specific one of the bits, that is specified by a stored address bit specifier, is asserted and, if so, generating a signal indicating that the image data receiver is addressed.

3. A method as set forth in claim 1 wherein the step of determining if a downstream image data receiver has generated an external Ready signal includes a step of receiving the external Ready signal from the downstream image data receiver, and further includes a step of storing the received external Ready signal within the image data receiver.

4. A method as set forth in claim 1 wherein the step of receiving information from the communications bus includes a step of storing the information within a FIFO buffer means.

5. A method as set forth in claim 4 and including a step of determining, with addressed ones of the image data receivers, if a data storage means has a sufficient number of unused memory locations to store a burst of image data, the burst being comprised of a predetermined number of data words.

6. A method as set forth in claim 5 wherein predetermined number is 256.

7. A method for transmitting image data over a communication bus from a source of image data to one or more of a plurality of image data receivers that are serially coupled along the communication bus, comprising the steps of:

generating, with each of the one or more of the plurality of image data receivers, an internal Ready signal;

storing the internal Ready signal within the image data receiver that generates the internal Ready signal; and determining with each of the one or more of the plurality of image data receivers if a downstream image data receiver, if there be one, has generated an external Ready signal indicating that the downstream image data receiver is ready to receive data; wherein if there is no downstream image data receiver for a particular one of the image data receivers, generating the external Ready signal with the particular one of the image data receivers and providing the generated external Ready signal to an upstream image data receiver, if there be one, or if not, providing the generated external Ready signal to the source;

if the downstream image data receiver for the particular one of the image data receivers has not generated the external Ready signal, idling the particular one of the image data receivers until the downstream image data receiver generates the external Ready signal;

if the downstream image data receiver has generated the external Ready signal, generating the external Ready signal with the particular one of the image data receivers and providing the generated external Ready signal to the upstream image data receiver, if there be one, or if not, providing the generated external Ready signal to the source; and in response to the reception of another received external Ready signal by the source of image data, transmitting image data to the communication bus, the image data being transmitted as a burst comprised of a plurality of data words, each of the data words specifying characteristics of at least one image pixel.

8. A method as set forth in claim 7 wherein each of the plurality of data words is comprised of 32-bits, and wherein a specified image pixel characteristic requires 24-bits for specifying red, green, and blue pixel colors.

9. A method as set forth in claim 8 wherein a remaining number of bits of each of the plurality of data words specifies a value used for mixing the image pixel with another image pixel.

10. A method for transmitting image data over a communication bus from a source of image data to one or more of a plurality of image data receivers that are serially coupled along the communication bus, comprising the steps of:

generating, with each of the one or more of the plurality of image data receivers, an internal Ready signal;

storing the internal Ready signal within the image data receiver that generates the internal Ready signal; and determining with each of the one or more of the plurality of image data receivers if a downstream image data receiver, if there be one, has generated an external Ready signal indicating that the downstream image data receiver is ready to receive data; wherein if there is no downstream image data receiver for a particular one of the image data receivers, generating the external Ready signal with the particular one of the image data receivers and providing the generated external Ready signal to an upstream image data receiver, if there be one, or if not, providing the generated external Ready signal to the source;

if the downstream image data receiver for the particular one of the image data receivers has not generated the external Ready signal, idling the particular one of the image data receivers until the downstream image data receiver generates the external Ready signal;

if the downstream image data receiver has generated the external Ready signal, generating the external Ready signal with the particular one of the image data receivers and providing the generated external Ready signal to the upstream image data receiver, if there be one, or if not, providing the generated external Ready signal to the source;

with the source of image data;

receiving the external Ready signal and, responsive thereto, transmitting information to the communication bus for addressing one or more of the image data receivers; and with each of the addressed image data receivers, receiving the transmitted information from the communications bus;

wherein the step of transmitting information transmits a plurality of data words that specify a size of and a location of a display image window.

11. A method for transmitting image data over a communication bus from a source of image data to one or more of a plurality of image data receivers that are serially coupled along the communication bus, the image data being transmitted in from one to N blocks, comprising the steps of:

generating, with each of the one or more of the plurality of the image data receivers, from one to at least N internal Ready signals, the number of generated internal Ready signals being a function of a number of the blocks that the image data receiver is capable of buffering;

storing the generated one to at least N internal Ready signals within the image data receiver that generates the one to at least N internal Read signals; and determining, with each of the one or more of the plurality of image data receivers, if a downstream image data receiver, if there be one, has generated at least one external Ready signal indicating that the downstream image data receiver is ready to receive data; wherein if there is no downstream image data receiver for a particular one of the image data receivers, generating an external Ready signal for each one of the stored internal Ready signals and providing the generated external Ready signal or signals to an upstream image data receiver, if there be one, or if not, providing the generated external Ready signal or signals to the source;

if the downstream image data receiver for the particular one of the image data receivers has not generated at least one external Ready signal, idling the particular one of the image data receivers until the downstream image data receiver generates at least one external Ready signal;

if the downstream image data receiver has generated at least one external Ready signal, receiving and storing, with the particular one of the image data receivers, the at least one external Ready signal that is generated by the downstream image data receiver, generating an external Ready signal for each stored internal Ready signal having a corresponding stored external Ready signal, and providing the at least one generated External Ready signal to the upstream image data receiver, if there be one, or if not, providing the at least one generated external Ready signal to the source.

12. An image data receiver, comprising:

means for interfacing the image data receiver to a communications bus means that couples the image data receiver to a source of image data and to at least one other image data receiver, the source sourcing the image data in a downstream direction to the image data receiver as a packet including up to N data blocks, said interfacing means including an input port capable of receiving the signals from a downstream image data receiver and an output port capable of providing signals to the input port of an upstream image data receiver;

means for generating and storing an indication of a capability to receive up to N data blocks from the source;

means, coupled to said input port, for receiving and storing a signal indicating a capability of a downstream image data receiver to receive up to N data blocks from the source; and means, coupled to said output port and responsive to a presence of a generated and stored indication of a capability to receive at least one data block from the source means and also to a received and stored indication from the downstream image data receiver, for transmitting in an upstream direction towards the source a signal indicating a capability to receive up to Y data blocks from the source, wherein Y is equal to the lesser of the generated and stored indication or the received and stored indication, and wherein Y=N when the generated and stored indication and the received and stored indication both equal N.

13. A method of transmitting image data over a communication bus from a source of image data to a plurality of image data receivers that are serially coupled along the communication bus, comprising the steps of:

asserting on the communication bus a Packet signal;

transmitting a first Burst of data words, the first Burst including an image data header specifying one or more of the image data receivers;

transmitting at least one further Burst of data words, the at least one further Burst being comprised of a plurality of data words, each of the data words specifying characteristics of at least one image pixel; and receiving the at least one further Burst with the one or more specified image data receivers.

14. A method as set forth in claim 13 wherein each of the plurality of data words is comprised of 32-bits and wherein a specified image pixel characteristic requires 24-bits for specifying red, green, and blue pixel colors.

15. A method as set forth in claim 14 wherein a remaining number of bits of each of the plurality of data words specifies a value used for mixing the image pixel with another image pixel.

16. A method as set forth in claim 13 wherein the step of transmitting at least one further Burst of data words includes an initial step of receiving a Ready signal generated by the one or more specified image data receivers, the Ready signal indicating that each of the specified image data receivers is ready to receive at least one further Burst.

17. A method as set forth in claim 13 wherein the image header further specifies a size of and a location of a display image window, the display image window being comprised of a plurality of image pixels that are specified by the at least one further Burst.

18. A system for displaying image data with a plurality of display means, comprising:

means for sourcing image data;

a plurality of image data receiver means; and communication bus means coupling together the sourcing means and the plurality of receiver means for transferring image data from the sourcing means in a downstream direction to one or more of the plurality of receiver means, individual ones of the receiver means being coupled to the communication bus means and having a receiver port for receiving signals from the communication bus means and an output port for providing the signals to the receiver port of a next receiver means; wherein each of the receiver means includes:

means for generating an indication of a capability to receive data from the sourcing means;

means for receiving a signal indicating a capability of a downstream receiver means to receive data from the sourcing means;

means, responsive to a presence of a generated indication of the capability to receive data from these sourcing means and also to a reception of an indication from the downstream receiver means, for transmitting in an upstream direction towards the sourcing means the signal indicating the capability to receive data from the sourcing means; and a first queue means for storing the generated indication of a capability to receive data from the sourcing means and a second queue means for storing the received signal indicating a capability of the downstream receiver means to receive data from the sourcing means.

19. A system as set forth in claim 18 wherein the transmitting means includes means for generating the signal indicating the capability to receive data from the sourcing means, the generating means being responsive to both the first queue means and the second queue means having a stored indication for generating the signal.

20. A system as set forth in claim 18 wherein the means for generating the indication of a capability to receive data from the sourcing means includes means for generating the indication only if the receiver means has previously been addressed by the sourcing means, and if a storage means has a sufficient number of unused memory locations to store the image data.

21. A system as set forth in claim 18 wherein the transmitting means transmits the signal in the upstream direction if (a) the receiver means has previously been addressed by the sourcing means, and if a storage means has a sufficient number of unused memory locations to store the image data, and if the signal has been received that indicates a capability of the downstream receiver means to receive data from the sourcing means, or (b) the receiver means has not previously been addressed by the sourcing means, and if the signal has been received that indicates a capability of the downstream receiver means to receive data from the sourcing means.

22. A system as set forth in claim 18 wherein the sourcing means includes a Communication bus transmitter means for transmitting data words in parallel to the communication bus.

23. A system as set forth in claim 22 wherein the transmitter means includes means for asserting a Request signal on the communication bus, means for receiving a Connect signal from the communications bus, means for asserting a Packet signal on the communications bus, and means for transmitting the data words as Bursts of data words during the assertion of the Packet signal.

24. A system as set forth in claim 23 wherein a first one of the Bursts includes information for specifying an individual one or ones of the image data receiver means for receiving the other ones of the Bursts, and wherein each of the image data receiver means includes means for determining if the information specifies the image data receiver means as one to receive the other ones of the bursts.

25. A system as set forth in claim 24 wherein each of the other ones of the Bursts is comprised of a plurality of data words, each of the data words specifying characteristics of at least one image pixel.

26. A system as set forth in claim 25 wherein each of the plurality of data words is comprised of 32-bits, and wherein a specified image pixel characteristic requires 24-bits for specifying red, green, and blue pixel colors.

27. A method as set forth in claim 26 wherein a remaining number of bits of each of the plurality of data words specifies a value used for mixing the image pixel with another image pixel.

* * * * *